United States Patent
Mukhopadhyay (10) Patent No.: US 7,320,756 B2
(45) Date of Patent: Jan. 22, 2008

(54) METHOD AND APPARATUS FOR TREATMENT OF FEEDWATERS BY MEMBRANE SEPARATION UNDER ACIDIC CONDITIONS

(76) Inventor: Debasish Mukhopadhyay, 4211 - Pomona Ave., Palo Alto, CA (US) 94306

( * ) Notice: Subject to any disclaimer, the term of this patent is extended or adjusted under 35 U.S.C. 154(b) by 0 days.

(21) Appl. No.: 10/140,445

(22) Filed: May 6, 2002

(65) Prior Publication Data

US 2002/0166823 A1   Nov. 14, 2002

Related U.S. Application Data

(60) Provisional application No. 60/288,861, filed on May 5, 2001.

(51) Int. Cl.
  *B01D 61/00*   (2006.01)
  *C02F 1/72*   (2006.01)
  *C02F 1/78*   (2006.01)
  *C02F 9/00*   (2006.01)

(52) U.S. Cl. ............. 210/652; 210/639; 210/650; 210/651; 210/759; 210/760; 210/900

(58) Field of Classification Search ........ 210/650–653, 210/638–639, 661, 900, 663, 660, 641, 748, 210/759, 760

See application file for complete search history.

(56) References Cited

U.S. PATENT DOCUMENTS 3,423,311 A    1/1969 Heatherington
3,795,609 A *  3/1974 Hill et al. ............. 210/636
4,200,526 A *  4/1980 Johnson et al. ......... 210/639
4,574,049 A *  3/1986 Pittner
5,028,336 A    7/1991 Bartels
5,043,072 A *  8/1991 Hitotsuyanagi et al.
5,073,268 A * 12/1991 Saito et al.

(Continued)

FOREIGN PATENT DOCUMENTS

EP        0302825 A1   2/1989

(Continued)

OTHER PUBLICATIONS

JP Publication No. 57207130, European Patent Office—Patent Abstracts of Japan, Published Dec. 18, 1992, Application No. 56090743, Applicant: Teijin Ltd., "Recovering Method For Valuable Material From Low PH Process Liquid of Surface Treatment for Metal", Iwata Kazumi (1 Page).

(Continued)

*Primary Examiner*—Ana Fortuna
(74) *Attorney, Agent, or Firm*—R. Reams Goodloe, Jr.

(57) ABSTRACT

A process for treatment of water via membrane separation equipment. A feedwater is maintained or adjusted to a pH of 4.3 or lower, and fed to a membrane separation system. In this manner, species such as TOC become more ionized, and (a) their rejection by the membrane separation process is significantly increased, and (b) their solubility in the reject stream from the membrane process is significantly increased. Passage TOC through the membrane is significantly reduced. A recovery ratio of eighty percent (80%) or higher is achievable with most feedwaters, while simultaneously achieving a substantial reduction in cleaning frequency of the membrane separation equipment. The method is particularly useful for the preparation of high purity water.

9 Claims, 2 Drawing Sheets

U.S. PATENT DOCUMENTS

| | | | |
|---|---|---|---|
| 5,250,185 A | | 10/1993 | Fansheng et al. |
| 5,254,257 A | | 10/1993 | Brigano et al. |
| 5,266,203 A | | 11/1993 | Mukhopadhyay et al. |
| 5,282,967 A | * | 2/1994 | Tatsuno et al. |
| 5,338,457 A | * | 8/1994 | Capozzola et al. ......... 210/652 |
| 5,476,591 A | | 12/1995 | Green |
| 5,670,053 A | * | 9/1997 | Collentro et al. |
| 5,766,479 A | * | 6/1998 | Collentro et al. |
| 5,925,255 A | * | 7/1999 | Mukhopadhyay |
| 6,190,556 B1 | * | 2/2001 | Uhlinger |
| 6,254,779 B1 | * | 7/2001 | Jeffery et al. |
| 6,267,891 B1 | * | 7/2001 | Tonelli et al. |
| 6,267,981 B1 | * | 7/2001 | Okamoto et al. ........... 424/426 |
| 6,303,037 B1 | * | 10/2001 | Tamura et al. |
| 6,398,965 B1 | * | 6/2002 | Arba et al. |
| 6,428,705 B1 | * | 8/2002 | Allen et al. |
| 6,464,867 B1 | * | 10/2002 | Morita et al. |
| 6,464,877 B1 | * | 10/2002 | Mori et al. |
| 7,156,997 B2 | * | 1/2007 | Marsh et al. .......... 210/500.38 |

FOREIGN PATENT DOCUMENTS

| | | | |
|---|---|---|---|
| EP | 0417506 A1 | | 3/1991 |
| JP | HEI-1-231988 | | 9/1899 |
| JP | 53-4777 | * | 1/1978 |
| JP | 54-83688 | | 7/1979 |
| JP | 56-139106 | | 10/1981 |
| JP | 57-139106 | * | 10/1981 |
| JP | SHO56-139106 | | 10/1981 |
| JP | 57-207130 | | 12/1982 |
| JP | 58-6297 | | 1/1983 |
| JP | 59-112890 | * | 6/1984 |
| JP | SHO60-190298 | | 9/1985 |
| JP | 62-204892 | * | 9/1987 |
| JP | 62-294484 | * | 12/1987 |
| JP | 63-201961 | * | 8/1988 |
| JP | HEI-1-231988 | | 9/1989 |
| JP | 2-207888 | * | 8/1990 |
| JP | 6-233 | | 1/1994 |
| JP | 6-49191 | | 1/1994 |
| JP | 06-63549 | | 3/1994 |
| JP | SHO59-112890 | | 6/1994 |
| JP | SHO80-190298 | | 9/1995 |
| JP | 2733573 | | 3/1998 |
| JP | 11-42479 | | 2/1999 |
| JP | 2002-66259 | | 3/2002 |
| SU | 0632656 | | 11/1978 |
| WO | WO 02/26362 A1 | | 4/2002 |

OTHER PUBLICATIONS

JP Application No. JP57207130A, Abstract, Derwent Publications, J57207130, Dec. 18, 1982, (1 Page).

JP Publication No. 02207888, European Patent Office—Patent Abstracts of Japan, Published Aug. 17, 1990, Application No. 01027073, Applicant: Japan Organo Co. Ltd., "Method and Apparatus For Producing Ultra-Pure Water", Yoda Toshio(1 Page).

JP Application No. JP19890027073 (prev. pub. J02207888, Abstract Derwent Publications, J02207888, Aug. 17, 1990, (1 Page).

JP Publication No. 11042479, European Patent Office—Patent Abstracts of Japan, Published Feb. 16, 1999, Application No. 09217118, Applicant: Japan Organo Co. Ltd., "Treatment of Waste Water", Tanaka Jun (1 Page).

JP Publication No. 2002066259, European Patent Office—Patent Abstracts of Japan, Published Mar. 5, 2002, Application No. 2000259279, Applicant: Kurita Water Ind. Ltd., "Pure Water Production", Osawa Kiminobu (1 Page).

JP Application No. 2000259279, Abstract, Derwent Publications, JP2002066259, Mar. 5, 2002, (1 Page).

EP Application No. 02789456.7, Supplemental Search Report—Feb. 13, 2006.

Chima i Technologia Vody, 14(4), p. 284-90 (1992) (as translated from German language) (7 pages).

Summary of the data bank Chemical Abstracts, Karelin F.N.; Khakimov, R.O. Caplus, Khimiya I Tekhnologiya Vody 91992) (1 page).

Summary of the data bank Chemical Abstracts, JP60125208; Caplus (1 page), Apr. 7, 1985.

"Water Desalination—Chapter 8 Ion Exchange", Publication No. Army TM 5-813-8, Departments of the Army, Publication Dtae: Sep. 15, 1986 ( 8 pages including Table of Contents).

"Ullmann's Encyclopedia Of Industrial Chemistry", Fifth, Completely Revised Edition, V91. A23, Refractory Ceramics to Silicon Carbide; Editors: Elvers. B., Hawkins, S.; Russy, W. and Schulz G. (4 pages), Dec. 2, 2004.

Summary of databank EMBASE of Water Science and Technology (1989) and Applied and Enviornment Microbiology (1978) (1 page).

Rompp Chemie Lexikon, Herausgeber, Prof. Dr. Jurgen Falbe, Prof. Dr. Manfred Regitz, 9, erweiterte und neubearbeitete Auflage, Georg Thieme Verlag Stuttgart—New York (German language document) (3 pages); >>>>English Translation provided—Rompp Chemical Lexicon, #4 OPPS, Elsevier 1980—Kayser et al, Medical Microbiology, Stuttgart, Thieme Publishing, 1985, (7 pages)—with attached verification of translation (1 page).

The Role of Silica In Water Treatment (Part I); amber-hi-lites, No. 164, Summer, 1980, pp. 444-450 (7 pages).

"Alkalinity Relationships in Water Chemistry" Technifax, Worldwide Leader/On-site expert, Nalco Chemical Company (4 pages), 1974, 1997.

"Separation Potential of Nanofiltration Membranes", Rautenbach, R. and Groschl, A., Elsevier Science Publishers B.V., Amsterdam—Desalination, 77 (1990) 73-84 (12 pages).

"Practical Ion Exchange" written by Shozo Miyahara, et al, Jan. 1, 1972, issued by Chemical Engineering pp. 99-102 (in Japanese language (English translation provided (6 pages).

"Practical Ion Exchange" Miyahara, A.; Ohmagari, T.; and Sakai, S., Organo Corporation. (8 pages), Jan. 1992, Publishe by Kaga ku Kogyo LTD (pp. 99-102).

Nalco Chemical Company, "Alkalinity Relationshis In Water Chemistry", Technifax reference, 1974, 1997.

Impadoc Record, Delphion, SU0632656T, "Method of Cleaning Waste Water"; Nov. 15, 1978 (1 page).

JP56-13906A (Abstract) Classification, Purification and Concentration of Solutes, 30.10 1981, Teruki Tsukamoto (1 page).

JP56-112890—Publication Date: Jun. 29, 1984, Yokoyama, Fumio; Applicant: Organo KK; Abstract, "Desalination by Reverse Osmosis Membrane Device", document bibliography and Abstract; data supplied from esp@cenet database (1 page).

JP62-294484—Publication Date: Dec. 21, 1987, Ushigoe Kenichi; Applicant: Shinko Fuaudoraa KK; Abstract "Reverse Osmosis Treatment of Water Containing Silica At High Concentration", document bibliography and Abstract; data supplied from esp@cenet database (1 page).

JP60-125208—Patent Abstracts of Japan, Publication Date: Apr. 1985; Ito Kakichi, Nakamura Tadashi, Regeneration of Reverse Osmosis Membrane Apparatus (2 pages).

"Separation/Concentration of Boric Acid and Its Salts", Permasep Technical Data, Technical Bulletin 402, Issued May 8, 1972 (2 pages).

Permasep Engineering Manual from DuPont Company (1982), Bulletin 502, p. 14 and p. 16, Dated: Dec. 1, 1982 (2 pages).

"Technical Manual for Filmtec FT30 Membrane Elements", Dec. 1991, 4.3 Water Chemistry and Pretreatment, (13 pages including title page).

Aachener Membran Kolloquium Preprints—19.-21.3.91, Aachen, IVT GVC, VDI-Gesellschaft (German language document)(15 pages) ; >>>>English Translation provided—Aachener Membrance Colloquium Preprints Mar. 19 to 21, 1991, Aachen, Germany, Association of German Engineers, Publisher: GVD-VDI Association for Process Technology and Chemical Engineering Matters, Appearance 1991 (20 pages)—with attached verification of translation (1 page).

Treatment of Silicon Containing Waters by Reverse Osmosis, F.N. Karelin, R.O. Khakimov, (undated) (7 pages).

"The Primary Treatment System", Isamu Sugiyama and Yoshitaka Yamaki, Ultraclean Technology Handbook, 1993, Nomura Micro Science C. Ltd., Kanagawa, Japan (15 pages including publication data title page).

"Sodium Slip-Curves of the Strongly Acidic Cation Exchanger", Lewatit S 100, measured as the NaOH-conductivity of the eluate of a subsequent, strongly basic, anion exchanger, 1966, (as translated from German language—*Lewetit, Verlauf von Schlupfkurven bei unterschiedlichem Regenerierminelaufwand*—(1 page).

Connection between conductivity and concentration of aqueous salt solutions, among which, NaOH solutions (as translated from German language) "Conductivity of Deionised Water vs Electrolyte Concentration (25° C.)" (1 page).

A presentation of "Sodium Slip-Curves of the Strongly Acidic Cation Exchanger" as indicated above, with recalculation of the NaOH-conductivity into corresponding pH-values, derived from "Sodium Slip-Curves of the Strongly Acidic Cation Exchanger" *as referenced above* and "Conductivity of Deionised Water vs Electrolyte Concentration (25° C)" *as referred above* (as translated from German language)—*Lewetit, Verlauf von Schlupflourven bei unterschiedlichem Regeneriermittelaufwand* (1 page).

"Membrane Treatment Technology System", First Volume, Mar. 15, 1991, issued by Fujitec Corporation, pp. 168-171 (in Japanese language) (8 pages); (English translation provided "The Comprehensive Membrane Treatment Tehcnology" (8 pages)).

"Diaion U. Application volume" Mitsubishi Chemical Industries Ltd, 1990, pp. 11-19; in Japanese language) (only title of document translated from Japanese language (6 page) with attached 2 pages (noted as p. 102, 103 and attachment). (English translation provided Diaion Ion Exchange Resin/Synthetic Absorbent Manual II—9 pages)).

"Fundamentals of Ion Exchange in Water Treatment", Parks, C.S. and Abrams, I.M. Diamond Shamrock Chemical Company (7 pages), 1969.

Removal of Salt, Oil, and Boron Form Oil Field Wastewater By High ph Reverse Osmosis Processing, Dyke, C.A.; Tao, F.T.; Tuohey, C.D.; Hobbs, R.D.; Sides, JL.; Weiser, J.D.; Texico Inc., Prepared for presentation at AICHE 1992 Annual Meeting, Florida, Nov. 1-6, 1992. Dated: Sep. 1992 (25 pages).

* cited by examiner

METHOD AND APPARATUS FOR TREATMENT OF FEEDWATERS BY MEMBRANE SEPARATION UNDER ACIDIC CONDITIONS

RELATED APPLICATIONS

This application claims priority from U.S. Provisional Patent Application Ser. No. 60/288,861, filed on May 5, 2001, and entitled METHOD AND APPARATUS FOR FLUID TREATMENT BY REVERSE OSMOSIS UNDER ACIDIC CONDITIONS, the disclosure of which is incorporated herein by this reference.

TECHNICAL FIELD

This invention relates to a method for the treatment of acidic waters and wastewaters in membrane based water treatment, purification, and concentration systems, and to apparatus for carrying out the method. More particularly, the invention relates to methods for feedwater pretreatment and for operation of membrane based treatment systems such as reverse osmosis ("RO") and nanofiltration ("NF"), which achieve increased solute rejection, thereby producing very high purity (low solute containing) product water, while significantly increasing on the on-stream availability of the water treatment equipment.

BACKGROUND

Naturally occurring acidic waters and acidic wastewaters from industrial processes are found in many geographical areas of the world. Conventional treatment methods commonly employed for treatment of such waters involve neutralization with alkali, to raise the pH, so that the water can be discharged or beneficially utilized. However, such methods are not always desirable, or even feasible in some instances, since such methods can add significant amounts of dissolved solids to the water. And, the cost of the necessary chemicals, and particularly the alkali, can be quite high.

If the treated water is to be utilized for potable applications, one commonly encountered standard which must be met is a World Health Organization criterion that potable water contain no more than 500 milligrams per liter of dissolved solids, and no more than 250 mg/l each of sulfate ion or chloride ion. However, criteria for reuse of water in most industrial applications are far stricter. Consequently, the common "straight neutralization" treatment process is not an acceptable option in a large number of water treatment applications.

In industrial applications, treatment/reclamation of acidic waters is most often presently based on ion-exchange or on reverse osmosis (RO) systems. Depending upon factors such as the level of hardness (polyvalent cations), total organic carbon (TOC), and other contaminants present in the water, anion-exchange can be used for treatment of such acidic feedwaters for the reduction/removal of acidity. Further, the addition of a cation exchange step before or after the anion exchange step can indeed produce water that is almost completely demineralized. For this process, a weak base, an intermediate base, or a strong base anion exchange resin is employed, either singularly or in combination.

The major advantages of such prior art ion exchange treatment methods include the following:

(1) In industry, the method is considered "passive", meaning that the process is not sensitive to changes in the influent characteristics.

(2) Compared to conventional reverse osmosis, the method has lower capital cost.

The major disadvantages of such prior art ion exchange treatment methods include the following:

(1) The quality, type (e.g., sodium based), and quantity of alkali needed (for regeneration of the IX resin) are actually higher and/or more restrictive than that required for straight neutralization, so the cost of the necessary chemicals is quite high.

(2) A very substantial volume of anion exchange resin is necessary; such resin is generally quite expensive. Thus, the initial and replacement cost of ion exchange resin in such systems is quite high compared to a membrane based treatment system.

(3) Depending upon the specific variety of ion exchange resin utilized, fouling by total organic carbon (TOC) can be quite high. Unfortunately, fouled anion resin can be difficult and expensive to clean. And, non-ioniizable TOC components, such as IPA (iso-propyl alcohol) are not removed. Further, TOC components that are cationic in nature are not removed, either. Typically, removal of TOC, or at least significant reduction of TOC, is often an important requirement in a number of industrial applications where reuse of treated waters is desired.

In conventional membrane based systems that are used for treatment of acidic waste waters or of naturally acidic waters, the pH of the RO/NF feed is commonly adjusted by addition of alkali. Thus, such conventional RO/NF systems operate at, or reasonably close to, neutral pH conditions. With certain exceptions, conventional RO/NF systems are operated under such pH conditions in order to ensure that the RO/NF membranes are not damaged due to very high or to very low pH conditions. More fundamentally, for many commonly encountered membrane materials, the overall solute rejection across the membrane is typically highest at a pH of approximately 8. Thus, the conventional wisdom in the water treatment industry is to avoid operation of RO/NF membranes at low pH conditions.

Yet, some of the basic RO/NF process characteristics point to some particular potential advantages, when compared to ion exchange systems. For example:

(1) RO/NF will simultaneously remove cationic as well as anionic species.

(2) RO/NF will, in general, remove a larger percentage of the TOC present before fouling of the media or membrane becomes a major concern. For instance, RO is capable of removing about 80%, or sometimes more, of non-ionizable species, such as IPA.

(3) The capital, as well as the operating costs of RO/NF systems, unlike those of ion-exchange systems, are not particularly sensitive to the influent water chemistry characteristics.

Nonetheless, the conventional RO/NF systems known to me for treatment of such acidic waters, whether for wastewaters or for naturally occurring waters, still exhibit major shortcomings. Such deficiencies include:

(1) The quantity and cost of alkali needed to neutralize the RO feed remain comparable to mere neutralization, alone. Consequently, overall treatment costs are high, since RO system capital and operating costs must be added to the costs of neutralization.

(2) The combination of pH neutralization followed by RO is fundamentally inefficient, since the total dissolved solids content is first increased by the pH neutralization step, but then the total dissolved solids content is decreased by the RO/NF step.

(3) RO/NF systems are quite susceptible to biofouling and/or particulate and/or organic fouling when they are operated at neutral or near neutral pH conditions. Unfortunately, however, the commonly utilized thin film composite membranes do not tolerate oxidizing biocides, such as chlorine. Consequently, control of biofouling is problematic, especially for treating waters containing organic contaminants.

Thus, a continuing demand exists for a simple, efficient and inexpensive process which can reliably treat acidic waters, whether naturally occurring or a wastewater from another process. It would be desirable to provide water of a desired purity, in equipment that requires a minimum of maintenance. In particular, it would be desirable to improve efficiency of feed water usage, and lower both operating costs and capital costs for water treatment systems, as is required in various industries, such as semiconductors, chemical production, mining, pharmaceuticals, biotechnology, and electric power plants.

Clearly, if a new water treatment process were developed and made available that combines the benefits of both conventional RO/NF membrane treatment and of ion exchange processes, particularly for the treatment of naturally occurring acidic waters as well as industrial waste waters, it would be of significant benefit. Additionally, such a process would be even more attractive if it were immune to the most vexing problems associated with either of reverse osmosis/nanofiltration or of ion exchange. In summary, an economically important new acidic water treatment process would necessarily offer some (if not most) of the benefits of both reverse osmosis and of ion exchange. At the same time, any such new process must be capable of effectively coping with the problems which beset the reverse osmosis/nanofiltration process or the ion exchange process.

OBJECTS, ADVANTAGES, AND NOVEL FEATURES

From the foregoing, it will be apparent that one important and primary object of the present invention resides in the provision of a novel method for treatment of water to reliably and continuously produce consistently pure water from acidic waters and wastewaters. More specifically, an important object of my invention is to provide a membrane based water treatment method which is capable of avoiding common pre-treatment costs and the operational fouling problems, so as to reliably provide a method of producing reliably pure water when operating at high efficiency. Other important but more specific objects of the invention reside in the provision of a method for water treatment as described in the preceding paragraph which has the following attributes:

(1) It is an advantage of my new process that on an overall "ownership and operating cost" basis, a process is provided which is cheaper to own and operate than conventional reverse osmosis/nanofiltration or ion exchange systems.
(2) It is an objective of the new process that it not require "close control", and accordingly it is easily able to cope with variability of feedwater.
(3) It is an advantage of the new process that it is reliably capable of producing a consistently high quality product.
(4) It is an objective of the new process that reverse osmosis/nanofiltration membranes be arranged to as to render them unsusceptible to biological or organic fouling.
(5) It is an objective of the new process that simultaneous removal of cationic, anionic, and non-ionic contaminants be achieved.
(6) It is an objective that a very substantial portion of the TOC present be rejected or removed, independent of the ionic characteristics of the TOC components.
(7) It is an objective of my novel process that the addition of chemicals be minimized, not only as a matter of cost, but also as a matter of good environmental stewardship.
(8) It is an advantage that my novel process that it can be practiced utilizing easily available components that are routinely manufactured by various companies.
(9) It is a novel feature of my process for treating acidic waters and wastewaters that available components are integrated synergistically, rather than in a contradictory manner, in order to provide the fullest possible benefit of available process equipment.
(10) It is an advantage that a high recovery rate, or volumetric efficiency, can be achieved when treating acidic waters and wastewaters.
(11) It is yet another advantage that a membrane can achieve a much higher productivity (flux) compared to conventional systems, and can do so while minimizing or eliminating membrane fouling; importantly, this also reduces capital and operating costs.
(12) Simplification and cost reduction in reverse osmosis/nanofiltration pretreatment operations is also an objective which is easily attainable by the practice of my novel acidic water treatment process.

Other important objects, features, and additional advantages of my invention will become apparent to those skilled in the art from the foregoing, and from the detailed description which follows, and from the appended claims, in conjunction with the accompanying drawing.

BRIEF DESCRIPTION OF THE DRAWING

In order to enable the reader to attain a more complete appreciation of the invention, and of the novel features and the advantages thereof, attention is directed to the following detailed description when considered in connection with the accompanying drawings, wherein.

The foregoing figures, being merely exemplary, contain various process steps or treatment elements that may be present or omitted from actual implementations depending upon the circumstances. An attempt has been made to draw the figures in a way that illustrates at least those elements that are significant for an understanding of the various embodiments and aspects of the invention. However, various other process steps or treatment elements of an exemplary low pH membrane treatment process, especially as applied for different variations of the functional components illustrated, may be utilized in order to provide a complete water or wastewater treatment system suitable for use in a particular set of circumstances.

DETAILED DESCRIPTION

By means of extensive studies and the evaluation of the weaknesses of the existing processes, I have now developed a new water treatment process for the processing of acidic waters. Importantly, I have now confirmed that certain reverse osmosis/nanofiltration systems can be successfully operated at pH values as low as 2, often without any, or with minimal chemical or physical pretreatment. Currently, the lowest allowable pH limit is determined by the characteristics of commercially available reverse osmosis membranes, which is about a pH of 2.0, for continuous operation. In the future, if better (i.e., lower pH tolerant) membranes become available, my novel process will operate at even lower pH than the current limit of pH 2.0.

In spite of low pH operations, and contrary to conventional industry guidelines, extremely good rejection of cationic solutes, and of multivalent anionic solutes, is achieved. The rejection of sodium and ammonium ions is extraordinarily high, and this is a very significant and unexpected benefit from my new acidic water treatment process. The rejection of TOC is also very high under the process conditions of this new acidic water treatment process.

Also, I have found that the addition of a TOC removal step prior to feed of water to a low pH reverse osmosis membrane (or even after it, or even later after the anion exchange step) can produce desired low TOC levels in the final product water. Acceptable TOC removal methods include:

(1) bubbling, including the use of microbubles of air or an inert gas, in a storage tank or any other suitable column of water;

(2) mechanical or membrane treatment based degasification;

(3) ultraviolet radiation with 185 nm wavelength UV light, with or without the addition of oxidants such as hydrogen peroxide and/or ozone;

(4) addition of ferrous or ferric iron, along with hydrogen peroxide, if needed, for in-situe formation of Fenton's reagent, which is known to be an effective oxidant for removing TOC compounds; or (5) addition of ozone to feedwater, or to product water.

An especially important application is possible when the hydrogen peroxide present from semiconductor manufacturing wastewaters is augmented with ferrous or ferric salts. In such a case, the oxidation products are typically organic acids, and or carbon dioxide, which can be effectively removed by an anion exchange step. In contrast, IPA cannot be removed by the anion exchange step, without prior oxidation, since it does not ionize.

Figure 1:
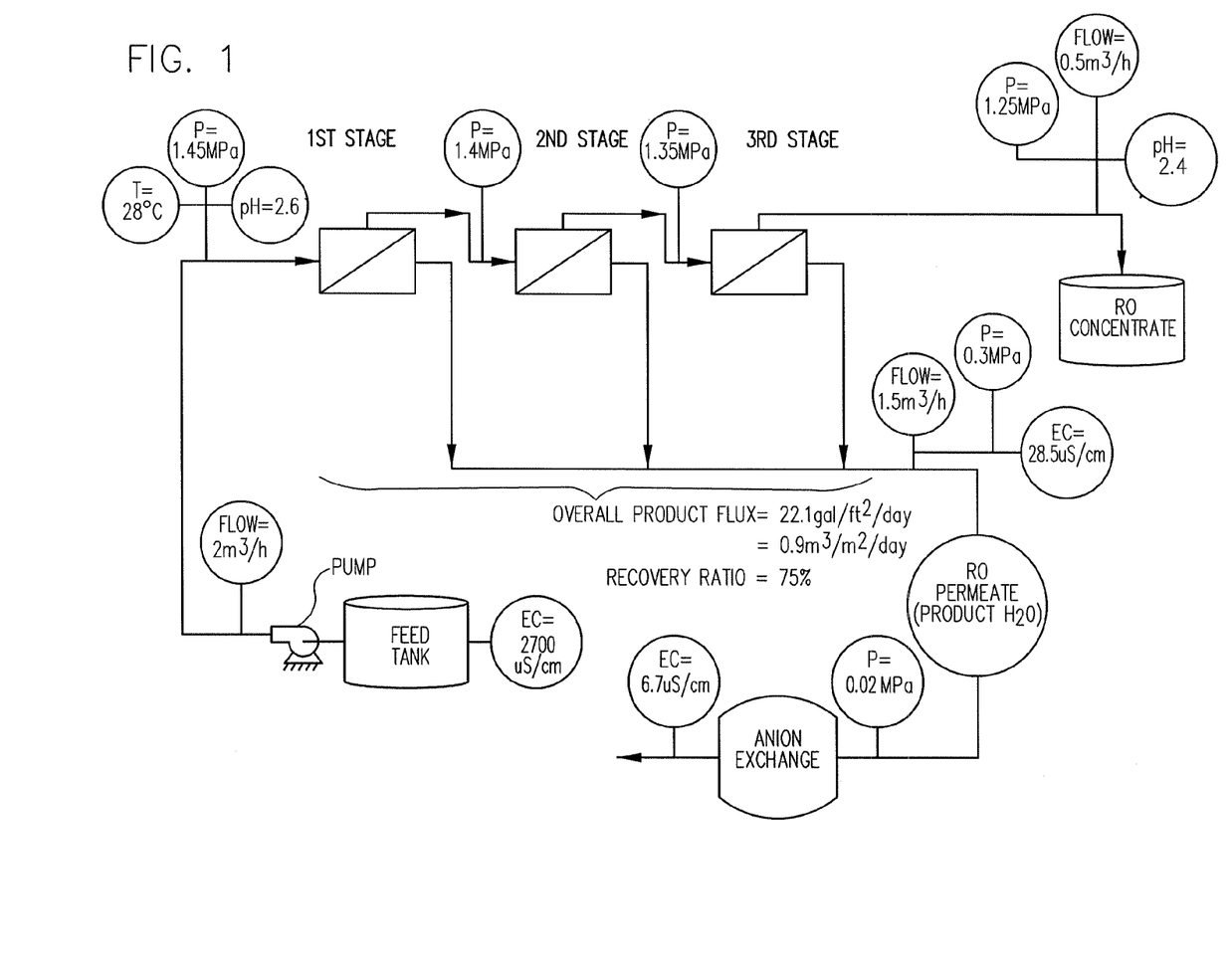
FIG. 1 illustrates a process flow diagram of the equipment utilized in a field test of my novel process for treating acid waters and wastewaters.

Turning now to FIG. 1, the test setup for one evaluation of my treatment process for acidic wastewaters is shown. A three-stage reverse osmosis system was utilized. Feedwater having a conductivity of 2700 uS/cm was fed under pressure at 1.45 MPa at the rate of 2 $m^3$/hr and at the pH of 2.6 and a temperature of 28 degrees C. to the first stage of the system. Subsequently, first stage reject was sent to the second stage at 1.4 MPa. Reject from the second stage was sent to the third stage at 1.35 MPa. Finally, rejected concentrate from the third stage was discharged at the pressure of 1.25 MPa and a pH of 2.4 at the rate of 0.5 $m^3$/hr. The permeate from all three stages together was produced at the rate of 1.5 $m^3$/h, a pressure of 0.3 MPa, and a conductivity of 28.5 uS/cm.

Overall, considering all three product stages, the product was produced at an average flux of 22.1 gallons per square foot per day (0.9 9089 $m^3$/m2/day). This provided an overall recovery ratio of about 75%. The RO permeate was then sent to an anion exchanger at a pressure of 0.02 MPa, and produced a final effluent, after anion exchange, having a conductivity of 6.7 uS/cm.

The exemplary results of such testing, and in particular the very high purity of the RO product, as well as the quality of the final effluent from the anion exchange step, demonstrate the efficacy of this novel process.

Figure 2:
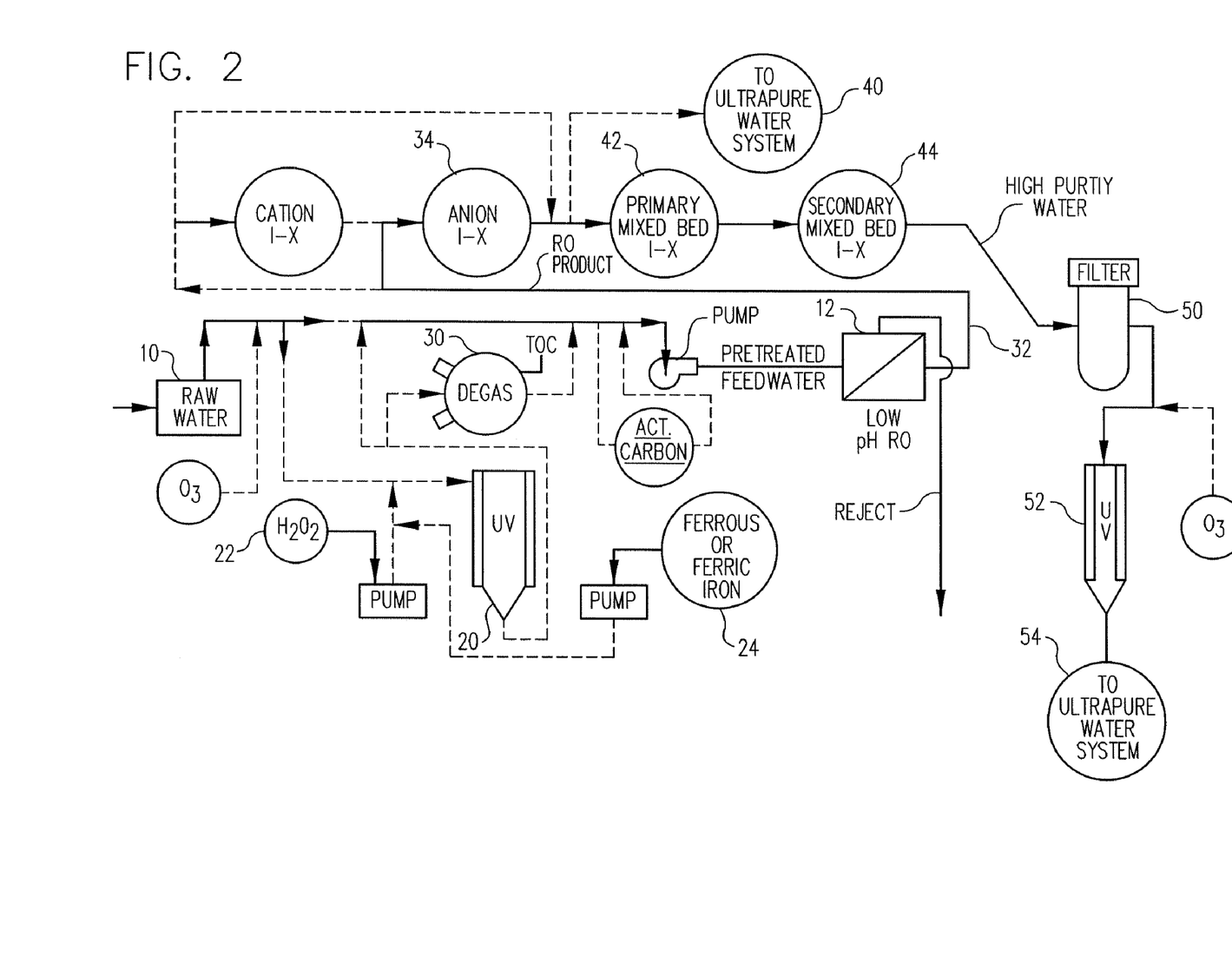
FIG. 2 illustrates a generalized process flow diagram for employing my novel water treatment process in a variety of applications and with a variety of feedwaters.

In FIG. 2, a generalized flow schematic is illustrated for use of my novel acidic wastewater treatment process in industry. Raw acidic water 10 is provided, either directly, as shown, to a low pH RO unit 12, or alternately, is routed through one or more pretreatment system components, as indicated in broken lines. First, the raw water 10 can be sent to a UV unit 20, in which preferably hydrogen peroxide 22 and/or a source of ferrous or ferric iron 24 is provided. Then, the partially treated water is routed to a degas 30 or other liquid-gas contactor, for further removal of TOC components. Reject from the RO is sent for further treatment or discharge as appropriate. Permeate as indicated by line 32 is sent to an anion ion exchange ("I-X") unit 34. Then, the product from the ion exchange treatment is ready for use as makeup to an ultrapure water system 40, or alternately, can be sent to primary mixed bed I-X units 42 and/or secondary mixed bed I-X units 44. Then, the high purity water can be used, or further treated as appropriate, such as in a filter unit 50 or a second UV treatment apparatus 52, before being sent to an ultrapure water (UPW) system 54.

The process described herein can be practiced in membrane separation equipment which includes at least one separation unit having a membrane separator, to produce a low solute containing product stream and a high solute containing reject stream. In the process, a feedwater stream containing solutes therein is provided for processing. In some cases, the solutes may include at least one constituent that contributes to membrane fouling when the feedwater does not contain free mineral acidity. Before processing the feedwater in a membrane separator, the pH of the feedwater is adjusted, if necessary, to assure that at least some free mineral acidity is present in the feedwater as input to the membrane separator. The pH adjusted feedwater is fed through the membrane separation equipment, in which the membrane substantially resists passage of at least some dissolved species therethrough, to concentrate the feedwater to a preselected concentration factor, to produce (i) a high solute containing reject stream, and (ii) a low solute containing product stream. Often, in this process, the pH of the feedwater is adjusted to a pH of about 4.3 or lower. Importantly, the process can be applied in applications where the membrane separator is a reverse osmosis membrane, or a nanofiltration membrane, or a loose reverse osmosis membrane.

For many important applications, the feedwater includes a total organic carbon (TOC) constituent, and the total organic carbon (TOC) is effectively removed from the product stream. For many applications, treatment objectives include removal of the TOC so that the TOC present in the product stream is approximately 10 percent or less of the concentration of such constituent in the feedwater. The process can be advantageously utilized when the TOC components include one or more substantially non-ionizable species, such as isopropyl alcohol, and acetone.

Other constituent removals are also of importance. For example, when the feedwater includes sodium ions, treatment in some applications be can be achieved to the degree where the product stream contains approximately two (2) percent or less of the sodium ion concentration present in the feedwater. And, when the feedwater includes ammonium ions, treatment in some applications can be achieved to the degree where the product stream contains approximately eight (8) percent or less of the ammonium ion concentration present in the feedwater. Where the feedwater includes chloride ions, treatment in some applications can be achieved to the degree that the product stream contains approximately twenty five (25) percent or less of the chloride ion concentration present in the feedwater. Where sulfate ions are present in the feedwater, treatment can be achieved to the degree that the product stream contains approximately one-half of one percent (0.5%) or less of the sulfate ion concentration present in the feedwater. However, with fluoride ions, it is common that the concentration of fluoride ions present in the product stream is approximately the same as the concentration of fluoride ions present in the feedwater stream.

As an additional step in the process of treatment of a feedwater at low pH in a membrane separation system, the free mineral acidity present in the product stream can be removed, at least to some desirable degree, if not substantially completely, by treatment in an anion exchange system. An appropriate anion exchange system could be (a) a weak base anion exchange system, (b) an intermediate base anion exchange system, or (c) a strong base anion exchange system. If desired, the anion exchange system can be set up to process the product stream to effectively removes all anions contained therein.

For further treatment effectiveness, particularly for removal of TOC, an additional feedwater treatment step, prior to treatment in the membrane separation unit, can be added. On suitable such treatment step includes the addition of either ferrous or ferric ions to the feedwater. In addition, in such a process, hydrogen peroxide could be further added, for example to create a Fenton's reagent for treatment of TOC. In this manner, total organic carbon constituents can be effectively eliminated the said product stream. Alternately, or additionally, the feedwater stream can be further treated prior to membrane separation by adding the step of irradiation of the feedwater stream with a UV light source, and in such a manner, the total organic carbon constituents can be effectively eliminated from the product stream. For yet further treatment to achieve high purity water effluent from the overall treatment process, the additional step of irradiation of the product water stream with a UV light source, so that the total organic carbon constituent is effectively eliminated from the product stream.

In yet another embodiment, the process further includes the step of ozonation of the feedwater stream with an ozone containing gas, and wherein the total organic carbon constituents are effectively eliminated from the product stream. Alternately, or additionally, the process can further include the step of ozonation of the product water stream with an ozone containing gas, so that the total organic carbon constituent is effectively eliminated from the product stream.

In yet another embodiment of the process of treating a feedwater in low pH membrane separation operation, in those cases where the feedwater contains hydrogen peroxide, either from an industrial process or via a prior treatment step, the process can be set up to further include the step of treatment of the feedwater stream in an activated carbon system, so that the hydrogen peroxide is effectively eliminated from the product stream.

Production of permeate product water at a production rate (flux) of at least 15 gallons per square foot per day is normally easily achievable. Importantly, the recovery is normally at least sufficient so that the ratio of the quantity of the product stream produced to the quantity of the feedwater stream provided is about seventy five (75) percent or more.

In other embodiments, the recovery is sufficient so that the ratio of the quantity of the product stream produced to the quantity of the feedwater stream provided is about eighty (80) percent or more. In yet other embodiments, the recovery is sufficient so that the ratio of the quantity of said product stream produced to the quantity of said feedwater stream provided is about eighty five (85) percent or more. In still further embodiments, the recovery is sufficient so that the ratio of the quantity of the product stream produced to the quantity of said feedwater stream provided is about ninety (90) percent or more. In certain applications, it is anticipated that the recovery will be sufficient so that the ratio of the quantity of the product stream produced to the quantity of the feedwater stream provided is about ninety five (95) percent or more.

For still more treatment in combination with the basic low pH membrane separation process described herein, other pretreatment steps can be provided prior to acidification of the feedwater. Such pretreatment processes can include (a) media filtration, (b) cartridge filtration, (c) ultrafiltration, (d) nanofiltration, (e) oxidant removal, (f) softening, (g) cation exchange, (h) degasification, or (i) oxygen removal. In some embodiments, the pretreatment step of cation exchange is accomplished by weak acid cation exchange. In other embodiments, the pretreatment step of cation exchange is accomplished by the step of strong acid cation exchange. Also, the pretreatment step of oxidant removal can include the addition of sodium meta-bisulfite to said feedwater. More generally, the process provided herein can be fundamentally described as the treatment of a feedwater stream in membrane separation equipment, wherein the membrane separation equipment has at least one unit having a membrane separator, to produce a low solute containing product stream and a high solute containing reject stream. In the process, a feedwater stream containing solutes therein is provided, and the pH of the feedwater stream is adjusted, if necessary, to assure at least some free mineral acidity presence, to produce a pretreated feedwater stream. The pretreated feedwater stream, having a preselected pH, is passed through the membrane separation equipment, wherein the membrane substantially resists the passage of at least some dissolved species therethrough, to concentrate the pretreated feedwater to a preselected concentration factor. A high solute containing reject stream having a pH lower than the pretreated feedwater stream is produced. Also, a low solute containing product stream having a pH higher than the pretreated feedwater stream is produced.

The unique process disclosed herein can also be advantageously practiced by further including the step of utilizing the reject stream from the membrane separation step in the regeneration of a cation exchange system. For example, such a process could include the step of utilizing the reject stream as an acid source for regeneration of a weak acid cation exchange system. Or, such a process could include the step of utilizing the reject stream as an acid source for regeneration of said strong acid cation exchange system.

The method and apparatus for processing acidic waters via membrane separation equipment, and in particular, via the combination of reverse osmosis/nanofiltration and ion exchange equipment, by the process design as described herein, provides a revolutionary, paradoxical result, namely, simultaneous decrease in total dissolved solids in the water to be treated, and reliable, high purity in the purified RO permeate. This method of operating membrane separation systems, and in particular, for operating reverse osmosis systems, represents a significant option for treating acidic waters, while simultaneously reducing capital and operating costs of the water treatment system. Further, given the efficiencies, dramatically less usage of chemical reagents, whether for neutralization, or for ion exchange regenerant or for RO cleaning, will be achieved per gallon of product water produced.

It will thus be seen that the objects set forth above, including those made apparent from the proceeding description, are efficiently attained, and, since certain changes may be made in carrying out the above method and in construction of a suitable apparatus in which to practice the method and in which to produce the desired product as set forth herein, it is to be understood that the invention may be embodied in other specific forms without departing from the spirit or essential characteristics thereof. For example, while I have set forth an exemplary design for treatment of acidic waters, other embodiments are also feasible to attain the result of the principles of the method disclosed herein. Therefore, it will be understood that the foregoing description of representative embodiments of the invention have been presented only for purposes of illustration and for providing an understanding of the invention, and it is not intended to be exhaustive or restrictive, or to limit the invention to the precise forms disclosed. On the contrary, the intention is to cover all modifications, equivalents, and alternatives falling within the spirit and scope of the invention as expressed in the appended claims. As such, the claims are intended to cover the methods and structures described therein, and not only the equivalents or structural equivalents thereof, but also equivalent structures or methods. Thus, the scope of the invention, as indicated by the appended claims, is intended to include variations from the embodiments provided which are nevertheless described by the broad meaning and range properly afforded to the language of the claims, or to the equivalents thereof.

The invention claimed is:

1. A process for treatment of a feedwater stream in reverse osmosis membrane separation equipment, said reverse osmosis membrane separation equipment comprising at least one unit having a reverse osmosis membrane separator, to produce a low solute containing product stream and a high solute containing reject stream, said process comprising:
   (a) providing a feedwater stream containing carbon dioxide and/or solutes therein, said solutes comprising cations;
   (b) pretreating said feedwater stream by controlling the pH to about 4.3 or lower, to assure at least some free mineral acidity in the pretreated feedwater at the point of feed to said reverse osmosis membrane separation equipment, without (i) removal of substantially all cations present in said feedwater stream, or (ii) removal of carbon dioxide;
   (c) passing the resultant pretreated feedwater through said reverse osmosis membrane separation equipment, said reverse osmosis membrane separation equipment substantially resisting passage of at least some dissolved species therethrough, to concentrate said pretreated feedwater to said preselected concentration factor, to produce
   (i) a high solute containing reject stream, and
   (ii) a low solute containing product stream;
   (d) wherein feedwater stream comprises a total organic carbon (TOC) constituent, and wherein said total organic carbon (TOC) constituent is effectively removed from said product stream; and
   (e) wherein said total organic carbon (TOC) constituent comprises one or more nonionizable species, and wherein said one or more non-ionizable species are selected from the group consisting of (a) isopropyl alcohol, and (b) acetone.

2. A process for treatment of a feedwater stream in reverse osmosis membrane separation equipment, said reverse osmosis membrane separation equipment comprising at least one unit having a reverse osmosis membrane separator, to produce a low solute containing product stream and a high solute containing reject stream, said process comprising:
   (a) providing a feedwater stream containing carbon dioxide and/or solutes therein, said solutes comprising cations;
   (b) pretreating said feedwater stream by controlling the pH to about 4.3 or lower, to assure at least some free mineral acidity in the pretreated feedwater at the point of feed to said reverse osmosis membrane separation equipment, without (i) removal of substantially all cations present in said feedwater stream, or (ii) removal of carbon dioxide;
   (c) passing the resultant pretreated feedwater through said reverse osmosis membrane separation equipment, said reverse osmosis membrane separation equipment substantially resisting passage of at least some dissolved species therethrough, to concentrate said pretreated feedwater to said preselected concentration factor, to produce (i) a high solute containing reject stream, and (ii) a low solute containing product stream;
   (d) wherein feedwater stream comprises a total organic carbon (TOC) constituent, and wherein said total organic carbon (TOC) constituent is effectively removed from said product stream;
   (e) wherein said total organic carbon (TOC) constituent in said product stream is approximately 10 percent or less of the concentration of such total organic carbon (ICC) constituent in said feedwater stream; and
   (f) wherein said total organic carbon (TOC) constituent comprises one or more nonionizable species, and wherein said one or more nonionizable species are selected from the group consisting of (a) isopropyl alcohol, and (b) acetone.

3. A process for treatment of a feedwater stream in reverse osmosis membrane separation equipment, said reverse osmosis membrane separation equipment comprising at least one unit having a reverse osmosis membrane separator, to produce a low solute containing product stream and a high solute containing reject stream, said process comprising:
   (a) providing a feedwater stream containing carbon dioxide and/or solutes therein, said solutes comprising cations;
   (b) pretreating said feedwaifer stream by controlling the pH to about 4.3 or lower, to assure at least some free mineral acidity in the pretreated feedwater at the point of feed to said reverse osmosis membrane separation equipment, without (i) removal of substantially all cations present in said feedwater stream, or (ii) removal of carbon dioxide;
   (c) passing the resultant pretreated feedwater through said reverse osmosis membrane separation equipment, said reverse osmosis membrane separation equipment substantially resisting passage of at least some dissolved species therethrough, to concentrate said pretreated feedwater to said preselected concentration factor, to produce (i) a high solute containing reject stream, and (ii) a low solute containing product stream; and
   (d) wherein said feedwater stream comprises ammonium ions, and wherein said product stream contains approximately eight (8) percent or less of the ammonium ion concentration present in said feedwater stream.

4. A process for treatment of a feedwater stream in reverse osmosis membrane separation equipment, said reverse osmosis membrane separation equipment comprising at least one unit having a reverse osmosis membrane separator, to produce a low solute containing product stream and a high solute containing reject stream, said process comprising:
  (a) providing a feedwater stream containing carbon dioxide and/or solutes therein, said solutes comprising cations and at least one total organic carbon (TOC) constituent, said total organic carbon (TOC) constituent comprising isopropyl alcohol or acetone;
  (b) pretreating said feedwater stream by controlling the pH to about 4.3 or lower, to assure at least some free mineral acidity in the pretreated feedwater at the point of feed to said reverse osmosis membrane separation equipment, without (i) removal of substantially all cations present in said feedwater stream, or (ii) removal of carbon dioxide;
  c) passing the resultant pretreated feedwater through said reverse osmosis membrane separation equipment, said reverse osmosis membrane separation equipment substantially resisting passage of at least some dissolved species therethrough, to concentrate said pretreated feedwater to said preselected concentration factor, to produce (i) a high solute containing reject stream, and (ii) a low solute containing product stream;
  (d) said process further comprising (i) adding either ferrous or ferric ions to said feedwater stream before feed to said reverse osmosis membrane separation equipment, as reactants to facilitate removal of total organic carbon (TOC) constituents, and (ii) adding hydrogen peroxide to said feedwater stream at any point before feed to said reverse osmosis membrane separation equipment.

5. A process for treatment of a feedwater stream in reverse osmosis membrane separation equipment, said reverse osmosis membrane separation equipment comprising at least one unit having a reverse osmosis membrane separator, to produce a low solute containing product stream and a high solute containing reject stream, said process comprising:
  (a) providing a feedwater stream containing carbon dioxide and/or solutes therein, said solutes comprising cations and at least one total organic carbon (TOC) constituent, said total organic carbon (TOC) constituent comprising isopropyl alcohol or acetone;
  (b) pretreating said feedwater stream by controlling the pH to about 4.3 or lower, to assure at least some free mineral acidity in the pretreated feedwater at the point of feed to said reverse osmosis membrane separation equipment, without (i) removal of substantially all cations present in said feedwater stream, or (ii) removal of carbon dioxide;
  (c) passing the resultant pretreated feedwater through said reverse osmosis membrane separation equipment, said reverse osmosis membrane separation equipment substantially resisting passage of at least some dissolved species therethrough, to concentrate said pretreated feedwater to said preselected concentration factor, to produce (i) a high solute containing reject stream, and (ii) a low solute containing product stream; and
  (d) wherein said feedwater stream comprises a total organic carbon (TOC) constituent, and said process further comprises ozonation of said feedwater stream with an ozone containing gas, and wherein said total organic carbon (TOC) constituent is effectively eliminated from said product stream.

6. A process for treatment of a feedwater stream in reverse osmosis membrane separation equipment, said reverse osmosis membrane separation equipment comprising at least one unit having a reverse osmosis membrane separator, to produce a low solute containing product stream and a high solute containing reject stream, said process comprising:
  (a) providing a feedwater stream containing carbon dioxide and/or solutes therein, said solutes comprising cations and at least one total organic carbon (TOC) constituent, said total organic carbon (TOC) constituent comprising isopropyl alcohol or acetone;
  (b) pretreating said feedwater stream by controlling the pH to about 4.3 or lower, to assure at least some free mineral acidity in the pretreated feedwater at the point of feed to said reverse osmosis membrane separation equipment, without(i) removal of substantially all cations present in said feedwater stream, or (ii) removal of carbon dioxide;
  (c) passing the resultant pretreated feedwater through said reverse osmosis membrane separation equipment, said reverse osmosis membrane separation equipment substantially resisting passage of at least some dissolved species therethrough, to concentrate said pretreated feedwater to said preselected concentration factor, to produce (i) a high solute containing reject stream, and (ii) a low solute containing product stream; and
  (d) wherein said feedwater stream comprises a total organic carbon (TOC) constituent, and wherein said process further comprises ozonation of said product water stream with an ozone containing gas, and wherein said total organic carbon (TOC)constituent is effectively eliminated from said product stream.

7. A process for treatment of a feedwater stream in reverse osmosis membrane separation equipment, said reverse osmosis membrane separation equipment comprising at least one unit having a reverse osmosis membrane separator, to produce a low solute containing product stream and a high solute containing reject stream, said process comprising:
  (a) providing a feedwater stream containing carbon dioxide andlor solutes therein, said solutes comprising cations and at least one total organic carbon (TOC) constituent, said total organic carbon (TOC) constituent comprising isopropyl alcohol or acetone;
  (b) pretreating said feedwater stream by controlling the pH to about 4.3 or lower, to assure at least some free mineral acidity in the pretreated feedwater at the point of feed to said reverse osmosis membrane separation equipment, without (i) removal of substantially all cations present in said feedwater stream, or (ii) removal of carbon dioxide;
  (c) passing the resultant pretreated feedwater through said reverse osmosis membrane separation equipment, said reverse osmosis membrane separation equipment substantially resisting passage of at least some dissolved species therethrough, to concentrate said pretreated feedwater to said preselected concentration factor, to produce (i) a high solute containing reject stream, and (ii) a low solute containing product stream;
  (d) said process further comprising an oxidant removal pretreatment step and one or more additional pretreatment processes, to assure at least some free mineral acidity, and wherein said pretreatment steps are selected from the group consisting of (i) media filtration, (ii) cartridge filtration, (iii) ultrafiltration, (iv) nanofiltration, (v) degasification, and (vi) oxygen removal; and (e) wherein said pretreatment process of oxidant removal comprises the addition of sodium meta-bisulfite to said feedwater.

8. A process for treatment of a feedwater stream in reverse osmosis membrane separation equipment, said reverse osmosis membrane separation equipment comprising at least one unit having a reverse osmosis membrane separator, to produce a low solute containing product stream and a high solute containing reject stream, said process comprising:

(a) providing a feedwater stream containing carbon dioxide and/or solutes therein, said solutes comprising cations;

(b) pretreating said feedwater stream by controlling the pH to about 4.3 or lower, to assure at least some free mineral acidity in the pretreated feedwater at the point of feed to said reverse osmosis membrane separation equipment, without (i) removal of substantially all cations present in said feedwater stream, or (ii) removal of carbon dioxide;

(c) passing the resultant pretreated feedwater through said reverse osmosis membrane separation equipment, said reverse osmosis membrane separation equipment substantially resisting passage of at least some dissolved species therethrough, to concentrate said pretreated feedwater to said preselected concentration factor, to produce (i) a high solute containing reject stream, and (ii) a low solute containing product stream;

(d) wherein said membrane separator comprises a loose reverse osmosis membrane;

(e) wherein feedwater stream comprises a total organic carbon (TOC) constituent, and wherein said total organic carbon (TOC) constituent is effectively removed from said product stream; and (f) wherein said total organic carbon (TOC) constituent comprises one or more nonionizable species, and wherein said one or more nonionizable species are selected from the group consisting of (a) isopropyl alcohol, and (b) acetone.

9. A process for treatment of a feedwater stream in reverse osmosis membrane separation equipment, said reverse osmosis membrane separation equipment comprising at least one unit having a reverse osmosis membrane separator, to produce a low solute containing product stream and a high solute containing reject stream, said process comprising:

(a) providing a feedwater stream containing carbon dioxide and/or solutes therein, said solutes comprising cations;

(b) pretreating said feedwater stream by controlling the pH to about 4.3 or lower, to assure at least some free mineral acidity in the pretreated feedwater at the point of feed to said reverse osmosis membrane separation equipment, without (i) removal of substantially all cations present in said feedwater stream, or (ii) removal of carbon dioxide;

(c) passing the resultant pretreated feedwater through said reverse osmosis membrane separation equipment, said reverse osmosis membrane separation equipment substantially resisting passage of at least some dissolved species therethrough, to concentrate said pretreated feedwater to said preselected concentration factor, to produce (i) a high solute containing reject stream, and (ii) a low solute containing product stream;

(d) wherein said membrane separator comprises a loose reverse osmosis membrane;

(e) wherein feedwater stream comprises a total organic carbon (TOC) constituent, and wherein said total organic carbon (TOC) constituent is effectively removed from said product stream;

(f) wherein said total organic carbon (TOC) constituent in said product stream is approximately 10 percent or less of the concentration of such total organic carbon (TOC) constituent in said feedwater stream; and (g) wherein said total organic carbon (TOC) constituent comprises one or more nonionizable species, and wherein said one or more nonionizable species are selected from the group consisting of (a) isopropyl alcohol, and (b) acetone.

* * * * *

UNITED STATES PATENT AND TRADEMARK OFFICE
CERTIFICATE OF CORRECTION

| | |
|---|---|
| PATENT NO. | : 7,320,756 B2 |
| APPLICATION NO. | : 10/140445 |
| DATED | : January 22, 2008 |
| INVENTOR(S) | : Debasish Mukhopadhyay |

It is certified that error appears in the above-identified patent and that said Letters Patent is hereby corrected as shown below:

On the Title Page, Pg. 2 Item (56) under "Foreign Patent Documents".

In the first column, The second reference cited: after the words "JP HEI-I-231988", delete "9/1899" and substitute therefore --9/1989--.

On the Title Page, Pg. 2 Item (56) under "Other Publications".

In the second column, the fourth reference cited: after the words "Departments of the Army, Publication", delete "Dtae:" and substitute therefore --Date--.

In the second column, the twelfth reference cited: after the words "(8 pages). Jan. 1992.", delete "Publishe" and substitute therefore --Published--.

On the Title Page, Pg. 3 Item (56) under "Other Publications".

In the second column, the second reference cited: after the words "Diaion", delete "U." and substitute therefore --II.--.

In the second column, the second reference cited: after the words "translated from Japanese language", delete "(6 page)" and substitute therefore --(6 pages)--.

Column 5, line 25, after the words "including the use of", delete "microbules" and substitute therefore --microbubbles--.

Column 7, line 24, after the words "stream to effectively", delete "removes" and substitute therefore --remove--.

Column 7, line 29, after the words "added.", delete "On" and substitute therefore --One--.

Signed and Sealed this
Fifteenth Day of March, 2011

David J. Kappos
*Director of the United States Patent and Trademark Office*

CERTIFICATE OF CORRECTION (continued)
U.S. Pat. No. 7,320,756 B2

Column 7, line 34, after the words "effectively eliminated", insert --from--.

IN THE CLAIMS:

Column 9, line 67, after the words "one or more", delete "nonionizable" and substitute therefore --non-ionizable--.

Column 10, line 34, after the words "such total organic carbon", delete "(ICC)" and substitute therefore --(TOC)--.

Column 10, line 37, after the words "comprises one or more", delete "nonionizable" and substitute therefore --non-ionizable--.

Column 10, line 38, after the words "wherein said one or more", delete "nonionizable" and substitute therefore --non-ionizable--.